(12) United States Patent
Blodgett, Jr.

(10) Patent No.: US 7,175,219 B1
(45) Date of Patent: Feb. 13, 2007

(54) EXPANSION LINKAGE

(75) Inventor: Ray W. Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 95 days.

(21) Appl. No.: 10/894,154

(22) Filed: Jul. 19, 2004

Related U.S. Application Data

(60) Provisional application No. 60/488,636, filed on Jul. 18, 2003.

(51) Int. Cl.
*B62D 33/08* (2006.01)

(52) U.S. Cl. .................. 296/26.14; 296/165; 296/173; 74/121; 403/346; 403/349; 403/354

(58) Field of Classification Search ................ 296/156, 296/165, 171, 172, 173, 175, 26.01, 26.12, 296/26.13, 26.14; 403/346, 349, 354; 52/67; 74/121, 117
See application file for complete search history.

(56) References Cited

U.S. PATENT DOCUMENTS

| | | | | |
|---|---|---|---|---|
| 2,558,440 A | * | 6/1951 | Johnson | 81/412 |
| 2,779,224 A | * | 1/1957 | Coggburn | 81/3.44 |
| 3,325,136 A | * | 6/1967 | Radke et al. | 248/550 |
| 4,397,440 A | * | 8/1983 | Hall et al. | 248/550 |
| 5,570,924 A | * | 11/1996 | Few et al. | 296/175 |
| 5,927,679 A | * | 7/1999 | Hill | 248/588 |
| 6,536,821 B1 | * | 3/2003 | Gardner | 296/26.01 |
| 6,679,541 B1 | * | 1/2004 | Hanser et al. | 296/171 |
| 2003/0094827 A1 | * | 5/2003 | Faludy et al. | 296/26.06 |

\* cited by examiner

*Primary Examiner*—Lori L. Coletta
(74) *Attorney, Agent, or Firm*—Inskeep IP Group, Inc.

(57) ABSTRACT

In a preferred embodiment, the present invention provides a vehicle mounting bracket having an adjustable linkage mounting portion. The mounting bracket is fixed to the vehicle and the linkage system, while adjustment bolts on the mounting bracket allow the user to adjust the vertical height of linkage relative to the vehicle. Scalloped adjustment joints of the linkage allow a user to modify the joint angle while effectively increasing or decreasing the length of the linkage members.

27 Claims, 3 Drawing Sheets

EXPANSION LINKAGE

CROSS REFERENCE TO RELATED APPLICATIONS

This application claims the benefit of U.S. Provisional Application 60/488,636, entitled Expandable Linkage, filed Jul. 18, 2003 the entire contents of which are hereby incorporated by reference.

FIELD OF INVENTION

This invention relates broadly to a linkage arrangement for moving members together or apart. More particularly, this invention relates to a linkage that assists a slide-out room in expanding from and retracting into a vehicle.

BACKGROUND OF THE INVENTION

In order to increase the available interior space of a motorized or towable vehicle such as a motor home or trailer, slide-out rooms can be made integral with the vehicle. When the vehicle is in transit, the slide-out room can be retracted and stored in the vehicle's interior with the exterior wall of the slide-out room approximately flush with the vehicle's exterior. As such, there is typically adequate space within the vehicle's interior to accommodate users in transit and remain within the standard width limitations imposed upon a vehicle. When the vehicle is parked and leveled, the slide-out room is then slid outward through an opening formed in a sidewall of a fixed room, increasing the internal accommodations.

Typically, slide-out rooms usually include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

In some instances, linkage arrangements are included to support the slide-out room in both an expanded or retracted position. In one popular design, a plurality of elongated members are pivotally fixed to each other near their ends and midsections, forming a scissor-like formation. The free ends of the linkage assembly are pivotally mounted to the side of the slide-out room, as well as an adjacent section of the main vehicle room. For example, such an arrangement can be seen in U.S. Pat. No. 5,560,667 entitled Expandable Linkage, the contents of which are hereby incorporated by reference.

When properly mounted and adjusted, these linkage arrangements provide a lightweight and effective slide-out support mechanism. However, the linkage must be precisely aligned between the slide-out room and the vehicle body to function properly. A misaligned linkage may not fully retract into the vehicle, leaving the slide-out room partially outside the vehicle and unable to travel. Further, numerous factors can make mounting and adjustment to a vehicle body considerably difficult. For example, the linkage may be imprecisely mounted to the proper location on the vehicle, the connection points of the linkage to the vehicle may migrate, or the slide-out room may sag.

BRIEF SUMMARY OF THE INVENTION

It is an object of the present invention to overcome the limitations of the prior art.

It is an object of the present invention to provide a linkage system that can be adjusted after installation on a vehicle.

It is a further object of the present invention to provide a linkage system that allows a user to correct misalignments at connection points to a vehicle.

In one embodiment, the present invention provides a vehicle mounting bracket having a vertically adjustable linkage mounting portion. The mounting bracket is fixed to the vehicle and the linkage system, while adjustment bolts on the mounting bracket allow the user to adjust the vertical height of linkage relative to the vehicle. Scalloped adjustment joints of the linkage allow a user to modify the joint angle while effectively increasing or decreasing the length of the linkage members.

DETAILED DESCRIPTION OF THE INVENTION

The present invention provides an expandable linkage for a slide-out room of a vehicle that includes mechanisms to adjust the linkage position after installation. Thus, if the linkage is installed in a less than optimal position or the linkage becomes misaligned over time, a user may make simple adjustments to correct the mounting position instead of removing and repositioning the linkage.

Figure 1:
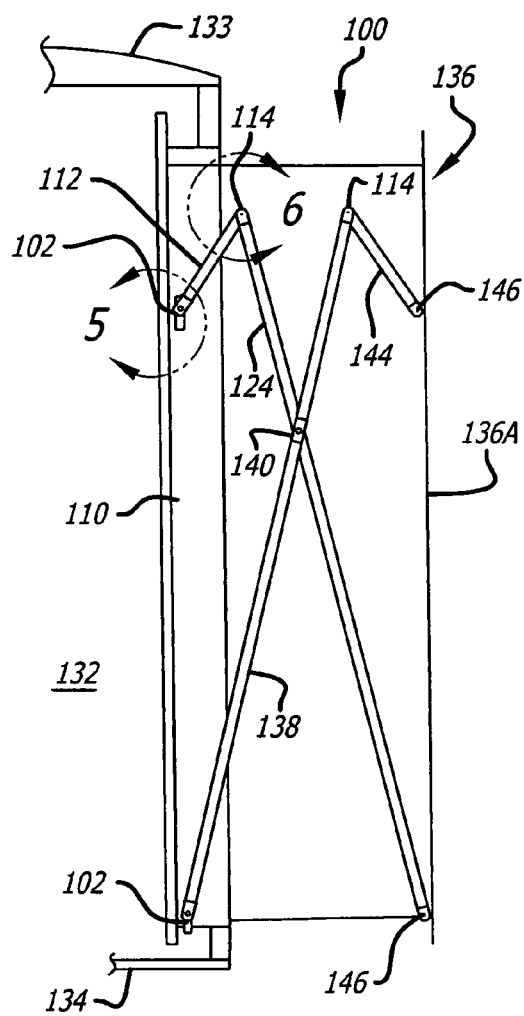
FIGS. 1–3 illustrate a side view of an expansion linkage according to the present invention.
Figure 2:
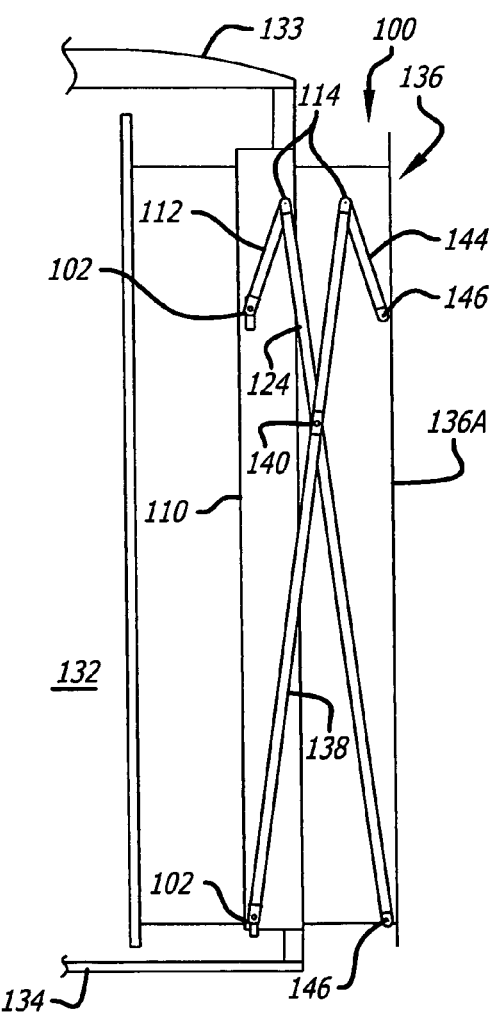
Figure 3:
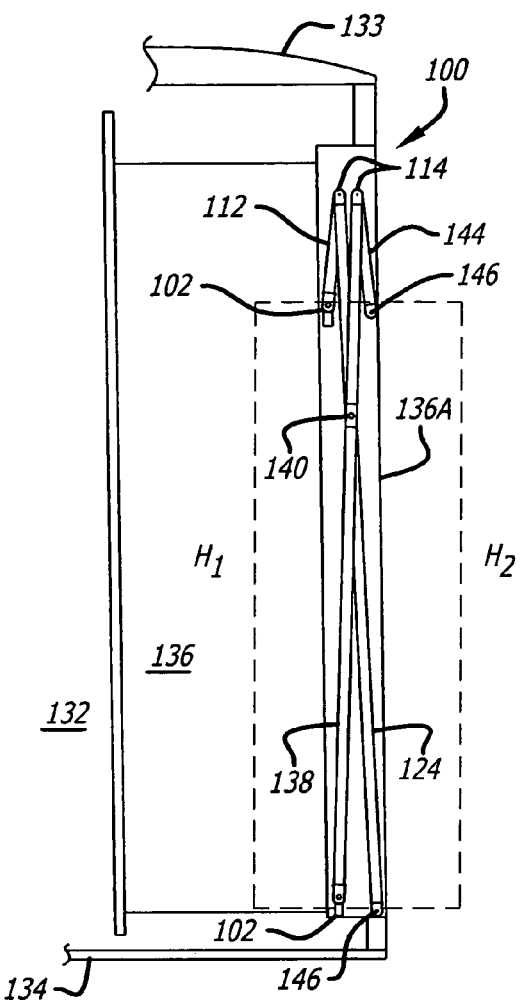

FIGS. 1–3 illustrate a preferred embodiment of a linkage 100 according to the present invention in an extended, partially retracted, and fully retracted position respectively. The linkage 100 includes adjustable mounting brackets 102 that allow vertical adjustment of the mounted position of the linkage 100 relative to a structural member of 110 of the vehicle. Additional adjustments to the linkage 100 are possible with scalloped adjustment joints 114 that allow for the pivot points of the linkage 100 to be modified.

A typical vehicle includes a roof 133, a floor 134, sidewalls (not shown), and a slide-out room 136. The slide-out room expands from and retracts into the vehicle, sliding over the vehicle floor 134. The linkage 100 mounts to a side of the slide-out room 136 and to a structural member 110 of the vehicle providing support as the slide-out room 136 expands from the vehicle. Typically, a linkage 100 is fastened to each side of the slide-out room 136.

In the preferred embodiment of FIGS. 1–3, the linkage 100 is composed of two upper linkage members 112 and 144 and two lower linkage members 124 and 138. The upper linkage member 112 and the lower linkage member 138 are each pivotally mounted to a structural member 110 of the vehicle via adjustable mounting brackets 102. The upper linkage member 144 and the lower linkage member 124 are fixed to a side area adjacent the outer wall 136a of the slide-out room 136. The upper linkage member 112 pivotally connects with lower linkage member 124, while lower linkage member 138 pivotally connects with upper linkage member 144. Further, the lower members 124 and 138 cross over each other and are pivotally mounted by a pivot joint 140 at their point of intersection. This arrangement allows the linkage 100 to expand and retract while providing support to the slide-out room 136.

As best seen in the preferred embodiment according to FIG. 3, symmetrical members of linkage 100 are mounted at the same relative height to the vehicle and slide-out room 136. For example, the upper linkage member 112 is preferably mounted at the same relative height (H1) to the vehicle as the upper linkage member 144 is to slide-out room 136 (H2). By mounting symmetrical members of linkage 100 at the same relative height, the linkage 100 completely retracts to the position seen in FIG. 3. However, if the relative height of the symmetrical members mounting location are offset, the linkage will be unable to fully retract, leaving the slide-out room 136 partially extended from the vehicle. Note that if the symmetrical linkage members (e.g. upper linkage member 112 and 144) are different sizes, they will mount at different heights relative to the vehicle and slide-out room 136 to achieve a completely retracted linkage 100 position.

The uneven relative height of the symmetrical members' mounting location may be, for example, due to improper installation, gradual misalignment of the slide-out room 136, or other changes affecting slide-out room 136 alignment. Additionally, even a slight misalignment may prevent proper linkage 100 retraction.

Figure 4:
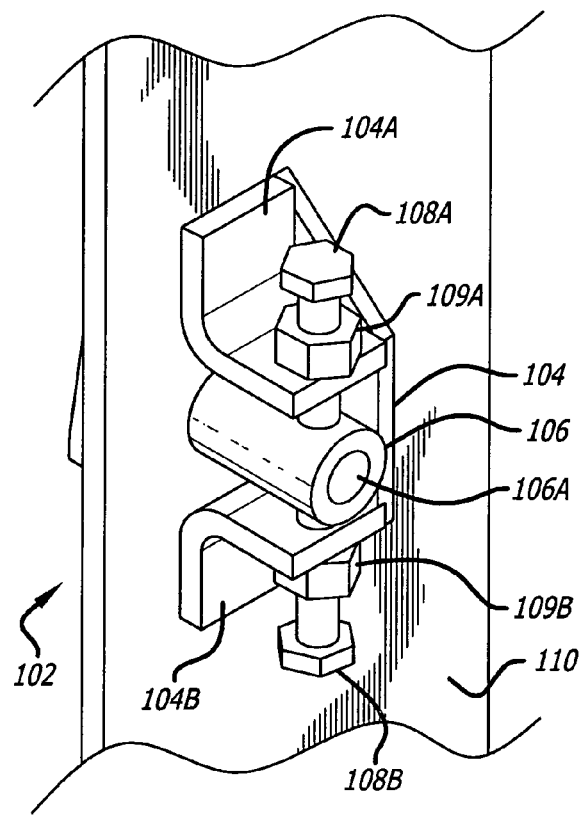
FIG. 4 illustrates a perspective view of a mounting bracket according to the present invention.

To compensate for this potential misalignment, adjustable mounting brackets 102 and scalloped adjustable joints 114 are included according to the present invention. The adjustable mounting brackets 102 can be best seen in FIGS. 4 and 5 according to the present invention. The adjustable mounting bracket 102 has a bracket 104 with an upper L-shaped region 104a and a lower L-shape region 104b. Between both L-shaped regions 104a and 104b is an internally threaded cylinder 106, positioned to expose its threaded opening 106a. The cylinder 106 is positioned within the adjustable mounting bracket 102 by two mounting bolts 108a, 108b and mounting nuts 109a, 109b. The mounting bolts 108a, 108b are positioned through opposite sides of the bracket 104 so as to contact and press against opposite sides of the cylinder 106. Thus, the vertical position of the cylinder 106 relative to the bracket 104 may be increased or decreased by adjusting the mounting bolts 108a, 108b.

Figure 5:
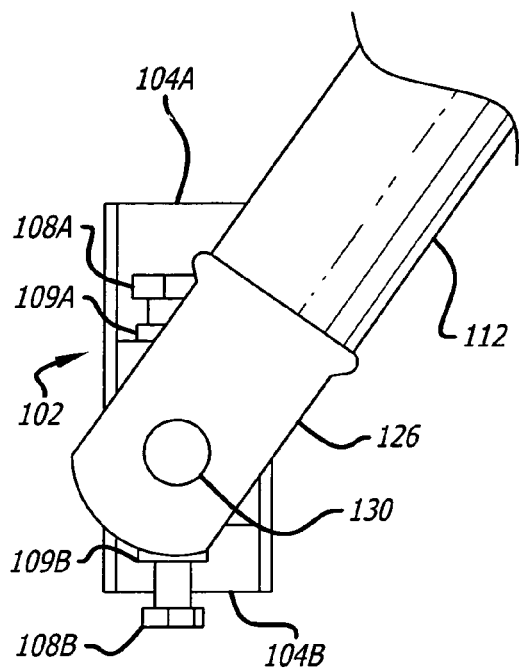
FIG. 5 illustrates a front view of the mounting bracket of FIG. 4.

As seen best in FIG. 5, a distal end of upper linkage member 112 includes an end region 126 having an aperture (not shown). A shoulder bolt 130 passes through the aperture and into the threaded cylinder 106, pivotally fastening the upper linkage member 112 to the adjustable mounting bracket 102.

FIGS. 1, 2, 3, and 6 illustrates another misalignment compensation mechanism according to the present invention. Scalloped adjustable joints 114 can be reconfigured to hinge at different locations within the linkage 100, thus increasing or decreasing the effective length linkage members. Preferably, the scalloped adjustable joints 114 are located at the joints between the upper linkage member 112, 114 and the lower linkage member 124, 138.

Figure 6:
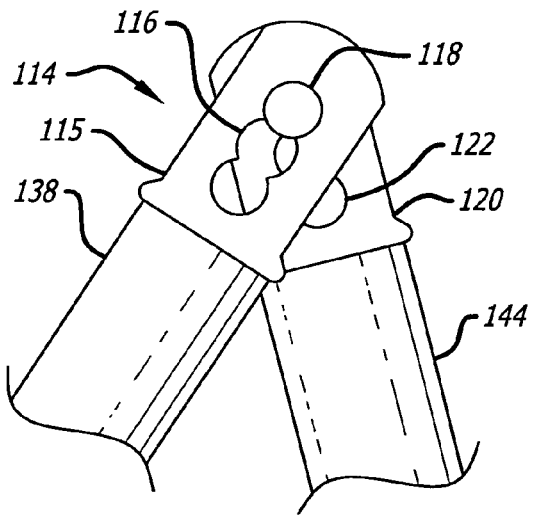
FIG. 6 illustrates a front view of a scalloped joint according to the present invention.

The scalloped adjustable joint 114 is comprised of a scalloped aperture within an end region of a linkage member. For example, scalloped aperture 116 may be seen within end region 115 of lower linkage member 138, or scalloped aperture 112, as seen within end region 120 of upper linkage member 144. As seen in FIG. 6, a shoulder bolt 118 passes through scalloped apertures 118 and 122, pivotally connecting the upper linkage member 144 with lower linkage member 138.

In a preferred embodiment, the scalloped adjustable joint 114 is included at each joint in the linkage 100. Further, the scalloped adjustable joint 114 preferably includes 3 possible locations for receiving the shoulder bolt 118.

In operation, a user installs the linkage 100 by first mounting two adjustable mounting brackets 102 to a structural member 110 of the vehicle, near the slide-out room. Preferably, the adjustable mounting brackets 102 are mounted in a position similar to that seen in FIGS. 1–3. Next, the linkage is pivotally mounted to a side of the slide-out room 136 at positions of approximately the same relative height as the adjustable mounting brackets 102. The linkage 100 is then pivotally fastened to the adjustable mounting brackets 102 by inserting a shoulder bolt through an aperture of an end region of a linkage member, such as shoulder bolt 130 through end region 126 of FIG. 5. The shoulder bolt 130 screws into the threaded opening 106a of cylinder 106.

With the linkage 100 in place, the user may make adjustments to the linkage 100 to allow for proper extension and retraction. Specifically, the user may adjust the mounting bolts 108a, 108b to raise or lower the cylinder 106. By adjusting the vertical position of the cylinder 106, the user changes the effective vertical mounting position of the linkage 100 to the structural member 110 of the vehicle.

Figure 7:
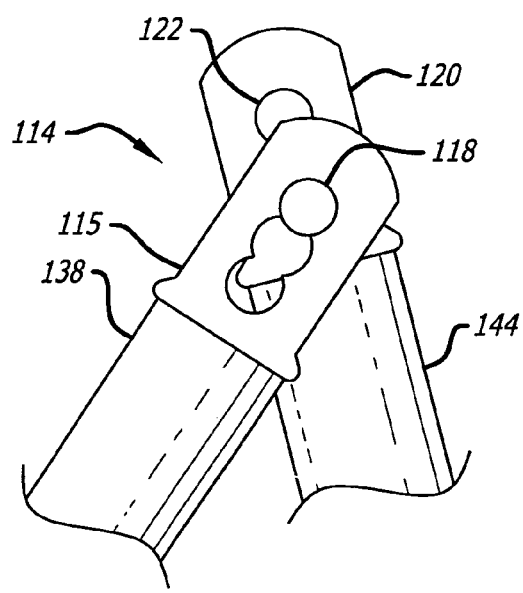
FIG. 7 illustrates a front view of the scalloped joint of FIG. 6.

The user may also adjust the scalloped adjustable joints 114 to modify the hinge point between linkage members. By changing the hinge points, the user effectively increases or decreases the length of the linkage 100 when fully extended. Additionally, increasing or decreasing the effective linkage member length allows a user to correct for misalignment or inaccurate mounting. For example, the upper linkage member 144 may be mounted to the slide-out room 136 with pivot joint 146 at a position lower than desired. To compensate, the scalloped adjustable joint 114 between upper linkage member 144 and lower linkage member 138 can be adjusted from an initial position, seen in FIG. 7, to the adjusted position seen in FIG. 6. Specifically, the user removes the shoulder bolt 118 from the scalloped adjustable joint 114. The scalloped adjustable joint 114 is then adjusted such that the shoulder bolt 118 is reinserted at the end-most portion of scalloped aperture 122. This positioning effectively elongates the upper linkage member 144, compensating for the lower mounting point.

The adjustment

With the aforementioned adjustment features, or at least one of them, the user is able to make minor adjustments during or after installation. This adjustability enables the user to either increase or decrease the slide-out room 136 seal pressure at any one of the four corners without affecting the other three corners. Thus, the adjustment features may also be used to enhance sealing between the vehicle and the slide-out room 136, as well as ensure proper linkage extension and retraction.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A linkage for supporting a movable slide-out room of a vehicle comprising:
    a plurality of pivotally connected linkage members forming a scissor-like linkage;
    at least two vehicle linkage attachment points statically connecting said scissor-like linkage to said vehicle;
    at least two slide-out room linkage attachment points statically connecting said scissor-like linkage to said movable slide-out room; and,
    a first adjustment mechanism mounted to at least one of said attachment points for adjusting the position of said at least one of said statically connected attachment points.

2. The linkage system of claim 1, wherein said first adjustment mechanism is actuatable to move at least a portion of said scissor-like linkage in a vertical direction relative to the vehicle.

3. The linkage system of claim 1, wherein said first adjustment mechanism includes a mounting bracket and a threaded cylinder movably positioned within said mounting bracket, said scissor-like linkage being connected to said threaded cylinder.

4. The linkage system of claim 1, wherein said first adjustment mechanism is mounted at said at least two vehicle attachment points.

5. The linkage system of claim 1, further comprising:
    a second adjustment mechanism, said second adjustment mechanism being disposed on at least one pivoting connection of said pivotally connected linkage members;
    said second adjustment mechanism including an aperture disposed on a first linkage member and an aperture disposed on a second linkage member;
    a fastening member sized to fit through both said first linkage member and said second linkage member
    said first linkage member aperture sized and shaped to allow said fastening member to connect said first linkage member to said second linkage member at one of at least two pivot positions within said first linkage member aperture.

6. The linkage system of claim 5, wherein said second linkage member aperture is sized and shaped to allow said fastening member to connect said first linkage member to said second linkage member at one of at least two pivot positions within said second linkage member aperture.

7. The linkage system of claim 5, wherein said first linkage member aperture is scalloped shaped.

8. The linkage system of claim 6, wherein said second linkage member aperture is scalloped shaped.

9. The linkage system of claim 1, wherein there are two vehicle linkage attachment points and two slide-out linkage attachment points.

10. The linkage system of claim 9, wherein said first adjustment mechanism is disposed at each of said two vehicle linkage attachment points.

11. A linkage for supporting a slide-out room of a vehicle comprising:
    a plurality of pivotally connected linkage members forming a scissor-like linkage including a first linkage member and a second linkage member;
    an adjustable joint pivotally connecting said first linkage member with said second linkage member;
    wherein said adjustable joint includes an aperture within said first linkage member, an aperture within said second linkage member and a fastening member removably positioned through each of said apertures so as to thereby connect said first and second linkage members;
    said first linkage member aperture sized and shaped to allow said first linkage member and said second linkage member to pivotally connect to each other by said fastening member at one of at least two positions within said first linkage member aperture.

12. The linkage of claim 11, wherein said first linkage member aperture of said adjustable joint has a scalloped shape.

13. The linkage of claim 11, wherein said fastening member is a bolt.

14. The linkage of claim 11, wherein said second linkage member aperture is sized and shaped to allow said first linkage member and said second linkage member to pivotally connect to each other by said fastening member at one of at least two positions within said second linkage member aperture.

15. The linkage of claim 14, wherein said second linkage member aperture of said adjustable joint has a scalloped shape.

16. The linkage of claim 11, further comprising:
    at least one adjustable attachment point statically connecting said scissor-like linkage to one of said vehicle and said slide-out room;
    wherein said at least one adjustable attachment point is actuatable to move at least a portion of said linkage in a substantially vertical direction after said scissor-like linkage is connected to at least one of said vehicle and said slide-out room.

17. A linkage for a slide-out room in a vehicle comprising:
    a plurality of arms forming a scissor-like linkage between said slide-out room and said vehicle;
    an adjustment joint disposed at a pivot connection between said plurality of arms; and,
    at least one adjustable attachment point statically connecting said scissor-like linkage to one of said slide-out room and said vehicle.

18. The linkage of claim 17, wherein said at least one adjustable attachment point is actuatable to move at least a portion of said scissor-like linkage in a vertical direction relative to said vehicle.

19. The linkage of claim 18, wherein said at least one adjustable attachment point includes a mounting bracket and a threaded cylinder movably positioned within said mounting bracket wherein at least a portion of said scissor-like linkage is connected to said threaded cylinder.

20. The linkage of claim 17, wherein said at least one adjustment joint includes an aperture disposed on one of said plurality of arms, said aperture sized and shaped to receive a fastening member for connecting said plurality of arms, said aperture further sized and shaped to receive said fastening member at a plurality of different locations in said aperture.

21. The linkage of claim 20, wherein said at least one adjustment joint further includes an aperture disposed on at least two of said plurality of arms, each of said apertures sized and shaped to receive a fastening member for connecting said plurality of arms, each of said apertures further sized and shaped to receive said fastening members at a plurality of different locations in said aperture.

22. A method of adjusting a linkage supporting a slide-out room of a vehicle comprising:
   providing a linkage to connect said slide-out room to said vehicle;
   connecting said linkage at a plurality of static attachment points to at least one of said slide-out room and said vehicle; and,
   adjusting a position of at least one of said plurality of static attachment points so as to adjust the position of at least a part of said linkage.

23. The method of claim 22, wherein the providing of a linkage includes providing a plurality of arms pivotally connected to one another at a plurality of pivot points.

24. The method of claim 23, further including changing at least one of said pivot points from a first location to a second location.

25. The method of claim 22, wherein the adjusting of a position of at least one of said plurality of static attachment points causes vertical movement of a part of said linkage that is attached to said vehicle.

26. A linkage for supporting a slide-out room of a vehicle comprising:
   a plurality of pivotally connected linkage members forming a scissor-like linkage;
   at least one stationary linkage attachment point connecting said scissor-like linkage to said vehicle;
   at least one movable linkage attachment point connecting said scissor-like linkage to said slide-out room;
   a first adjustment mechanism mounted to at least one of said attachment points wherein said adjustment mechanism is configured to change the position of at least a portion of said scissor-like linkage after connection of said scissor-like linkage to said slide-out room and to said vehicle;
   a second adjustment mechanism, said second adjustment mechanism being disposed on at least one pivoting connection of said pivotally connected linkage members;
   said second adjustment mechanism including an aperture disposed on a first linkage member and an aperture disposed on a second linkage member;
   a fastening member sized to fit through both said first linkage member and said second linkage member; and
   said first linkage member aperture sized and shaped to allow said fastening member to connect said first linkage member to said second linkage member at one of at least two pivot positions within said first linkage member aperture.

27. A linkage for supporting a slide-out room of a vehicle comprising:
   a plurality of pivotally connected linkage members forming a scissor-like linkage;
   at least one stationary linkage attachment point connecting said scissor-like linkage to said vehicle;
   at least one movable linkage attachment point connecting said scissor-like linkage to said slide-out room; and,
   a first adjustment mechanism mounted to at least one of said attachment points wherein said adjustment mechanism is configured to change the position of at least a portion of said scissor-like linkage after connection of said scissor-like linkage to said slide-out room and to said vehicle
   wherein there are two stationary linkage attachment points and two movable stationary linkage attachment points.

* * * * *